United States Patent [19]
Audisio et al.

[11] Patent Number: 5,592,924
[45] Date of Patent: Jan. 14, 1997

[54] INTERNAL COMBUSTION ENGINE ADAPTED TO OPERATE SELECTIVELY WITH INJECTION OF GASOLINE OR LPG

[75] Inventors: Filippo Audisio; Gianpiero Borello; Massimo Ferrera; Pietro Gianotti; Riccardo Gozzelino, all of Turin, Italy

[73] Assignee: Centro Ricerche Fiat Societa' Consortile Per Azioni, Turin, Italy

[21] Appl. No.: 596,478

[22] Filed: Feb. 5, 1996

[30] Foreign Application Priority Data

Feb. 3, 1995 [IT] Italy .................................. TO95A0064
May 24, 1995 [IT] Italy .................................. TO95A0405

[51] Int. Cl.$^6$ ................................................ F02M 21/02
[52] U.S. Cl. ........................................ 123/525; 123/575
[58] Field of Search ...................................... 123/525, 575

[56] References Cited

U.S. PATENT DOCUMENTS

| | | | |
|---|---|---|---|
| 5,228,423 | 7/1993 | Oikawa et al. | 123/525 |
| 5,377,645 | 1/1995 | Moore | 123/525 |
| 5,450,832 | 9/1995 | Graf | 123/525 |
| 5,526,797 | 6/1996 | Stokes | 123/575 |

FOREIGN PATENT DOCUMENTS 6123248  5/1994  Japan .................. 123/525

*Primary Examiner*—Erick R. Solis
*Attorney, Agent, or Firm*—Sughrue, Mion, Zinn, Macpeak & Seas

[57] ABSTRACT

There is described an internal combustion engine able to operate selectively either with gasoline injection or with injection of LPG in a liquid state, which is obtained from an engine able to operate only with gasoline injection.

10 Claims, 6 Drawing Sheets

INTERNAL COMBUSTION ENGINE ADAPTED TO OPERATE SELECTIVELY WITH INJECTION OF GASOLINE OR LPG

The present invention relates to an internal combustion engine, provided with a gasoline feed system, including many gasoline injection devices which are respectively associated with the cylinders of the engine, and an LPG feed system, including many LPG injection devices respectively associated with the cylinders of the engine, said engine adapted to operate selectively with gasoline or LPG injection.

The increasingly strict limitations imposed by laws to the noxious emissions from internal combustion engines have originated new interest by manufacturers in engines fed by LPG.

According to the conventional art, LPG engines are provided with a choke device for metering LPG to be mixed with the air fed to the engine, according to an arrangement similar to that of a conventional carburator of a gasoline engine. However, this solution is no longer acceptable, since it is not adapted to operate in cooperation with an electronic control system for operating the engine which is able particularly of controlling the metering as a function of the composition of the exhaust gasses detected by a so called lambda probe.

Therefore, it would be desirable to have engines fed by LPG and provided with an injection feed system.

The main object of the present invention is that of adapting a gasoline injection engine so that it can be fed both with gasoline and LPG with no substantial change to the structure of the engine.

In view of achieving this object, the present invention provides an internal combustion engine as indicated in annexed claim 1.

In a preferred embodiment, for each cylinder of the engine there is provided an adaptor member including a first element in one piece, including the said portion with the outlet hole and the seat for the gasoline injection device, and a second element including the seat for the LPG injection device, arranged at a distance from the first element and connected thereto by a connecting tube which communicates the outlet hole of the first element to the seat of the LPG injection device on the second element.

In a second embodiment, there is provided instead for each cylinder an adaptor member including the said portion with the outlet hole and both the said seats of the gasoline injection device and the LPG injection device.

In the case of the above mentioned first embodiment, the said second elements of the adaptor members associated with the various cylinders of the engine are connected to each other, either all together or in groups, into a structure including also a cavity acting as a manifold or "rail" for feeding LPG.

In the case instead of the said second embodiment, said LPG feeding rail is comprised of an element separated from the adaptor members, each of which is connected thereto by a connecting tube.

In both embodiments, the said connecting tubes are preferably comprised of flexible tubes of rubber or the like, whose ends are fitted on cooperating nipples of the connected elements.

Due to said features, the engine according to the invention may be obtained by simple, rapid and unexpensive operations from a conventional engine able to operate only by gasoline injection.

Furthermore, due to the above described features, the engine according to the invention is able to operate with injection of LPG in a liquid state notwithstanding the problems connected with the variation of the pressure of LPG in liquid state when temperature changes. In a typical case (percentages of propane and buthane forming LPG are indeed different in the various countries of the world) the pressure of LPG may go from a value of about 1 bar at a temperature of $-20°$ C. up to a value of about 20 bar at a temperature of $50°$ C. At the same time, the injection devices commercially available are able to operate properly in a range of pressure between about 3 bars and 22–23 bars. Because of this difficulty, the LPG feed systems which are usually used do not make use of injection devices and cause a passage of LPG to the gaseous state in the above mentioned choke device where the LPG is mixed to the air by a carburator-like arrangement. However, the injection of LPG in the liquid state is desirable since it allows the metering air/fuel to be controlled with more sophisticated means cylinder by cylinder, which gives a better operation of the catalytic converter for the exhaust gasses of the engine and is also preferable from the point of view of the volumetric efficiency thus providing a performance which is closer to that of an engine fed with gasoline.

The adoption of a feed pump in conjunction with said pressure adjuster enables the LPG to be fed in a liquid state to the injection devices at a pressure which is kept greater than the pressure of the vapour within the LPG reservoir by a substantially constant difference, which for example can amount to 2–3 bars. Thus, whichever is the temperature within the LPG reservoir, the LPG feed pressure to the injection devices is always included within the pressure range in which the injection devices operate properly. For example, at very low temperatures ($-20°$ C.), the feed pressure will be about 3 bars, whereas at high temperatures ($50°$ C.), the feed pressure will be about 22 bars, the pressure range at which the injection devices operate properly being, as already indicated, of 3–23 bars.

Furthermore, the adoption of an LPG feed rail separate from the gasoline feed rail, renders the system according to the invention particularly simple. Indeed, the adoption of a single rail which is selectively fed either with LPG or with gasoline coming from the gasoline feed system, would involve the adoption of a relatively complicated valve system in order to cut the communication of the rail to one of the two feed systems when the other system is used.

Finally, a further preferred feature of the invention lies in that the LPG feed pump is arranged inside the reservoir. The problem in connection with the feed pump is that it must be sealed against possible leakage of LPG in a gaseous state. A possible solution lies in arranging the pump inside the LPG reservoir, rather than out of it, thus eliminating the problem of the sealing with pressure variations up to 20 bars.

The electronic control of the gasoline injection is carried out in the usual way, by an electronic control unit, which is also used to control the LPG injection. However, in this case the way in which said control unit operates is modified by an auxiliary electronic control unit as a function of the characteristics of the LPG which is fed in a liquid state.

A further aspect of the invention is the following. In feed systems of the conventional type with injection of fuel in a gaseous state, an important parameter in ensuring the regular operation of the engine in terms of a homogeneous distribution of the air/fuel mixture cylinder by cylinder is constituted by the timing of the beginning of the injection immediately after the opening of the intake valve of the cylinder involved. This is due to that the LPG injected into a cylinder having the intake valve closed may be sucked into the conduit of another cylinder which during that stage has its intake valve opened. The low inertia of a gas with respect to a liquid, and the volume occupied within the conduit are the main reasons of the above mentioned phenomenon.

Studies and tests conducted by the applicant have shown that this problem ceases to exist in the case of an injection of LPG in a liquid state, where the injected fuel occupies the same volume as an equal mass of fuel injected in a liquid state.

Starting from this remark, a further object of the present invention is that of improving the above indicated system by providing a control of the injection timing with particularly simple and unexpensive means.

In view of achieving this object, the engine according to the invention is further characterized in that there are provided sensor means of the rotational speed of the engine shaft including a phonic wheel, and in that said electronic control means are programmed to carry out the injection at a first cylinder of the engine, after starting of the engine, when a first signal from said phonic wheel has been received and to control in sequence thereafter, at regular intervals from the first injection, the injection in the other cylinders of the engine, said system thus being deprived of means adapted to provide a predetermined timing of the beginning of the injection in the various cylinders with respect to the angular position of the engine shaft.

The time at which the first signal from the phonic wheel is received, after starting of the engine, may change from time to time, also as a function of the phonic wheel which is used. However, the applicant has surprisingly realized that this variation does not have any detrimental effect on the proper operation of the engine. As already indicated, once the first injection at one cylinder of the engine has been carried out, the injection in the other cylinders is controlled as a consequence, at regular intervals from the first injection, and the cycle is of course repeated with the continued rotation of the engine shaft. As already indicated, the variation of the beginning of the injection with respect to the angular position of the engine shaft does not have any influence on the distribution of the air/LPG mixture cylinder by cylinder.

Further features and advantages of the invention will become apparent from the description which follows with reference to the annexed drawings, given purely by way of non limiting example, in which:

BRIEF DESCRIPTION OF THE DRAWINGS

With reference to FIGS. 1, 2, numeral 1 designates the head of an internal combustion engine which is initially provided for injection of gasoline only. To the head 1 there is fixed an intake manifold 2 having a plurality of conduits 3 (only one of which is visible in FIG. 1) which are respectively for feeding air to the cylinders of the engine. At each conduit 3, the wall of the intake manifold has a hole 4 which originally constitutes the seat for the gasoline injection device.

Figure 1:
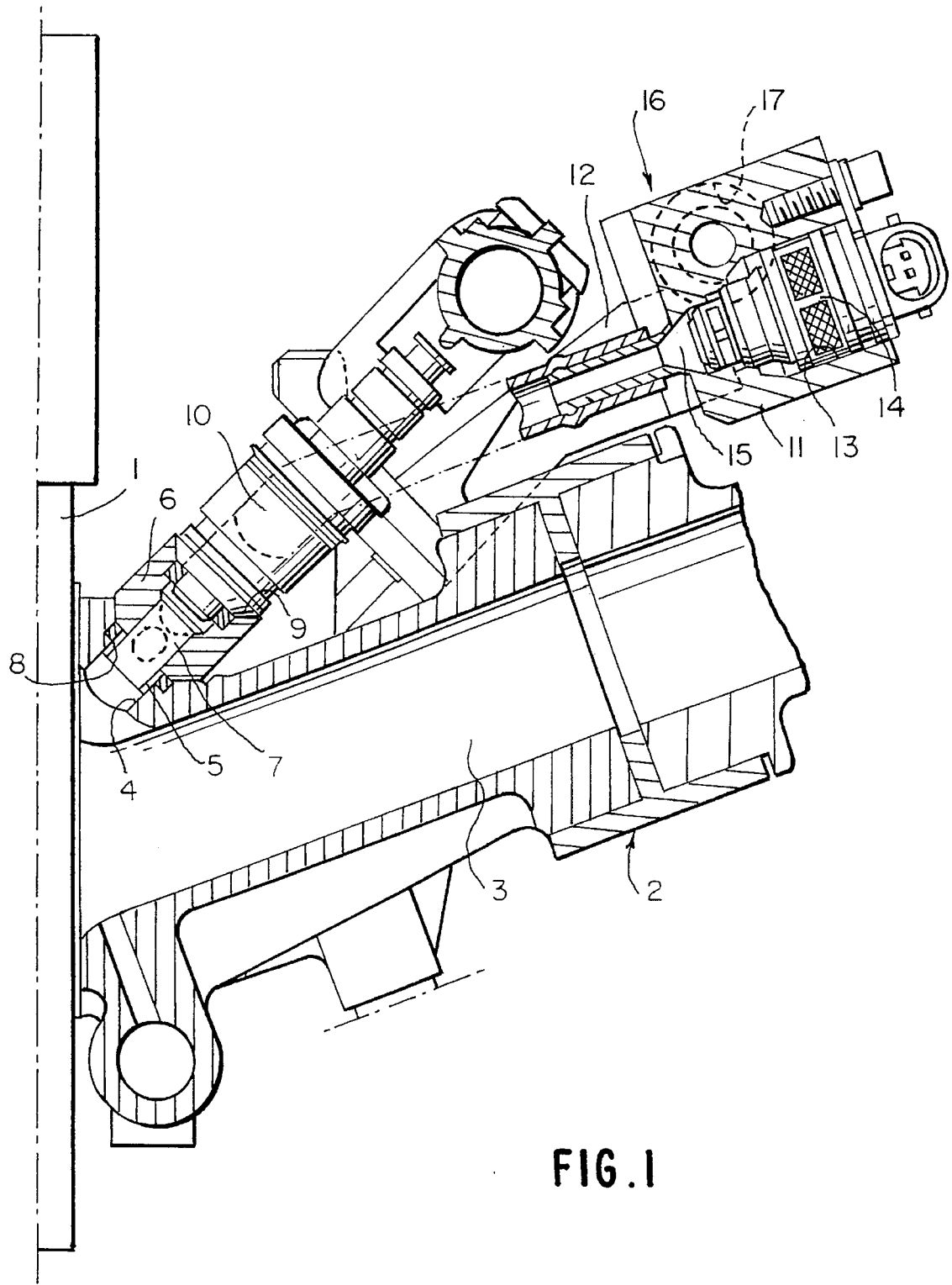
FIG. 1 is a cross-sectional view of a detail of a first embodiment of the device according to the invention.

In order to adapt the hole 4 both for the gasoline injection device, and for a further device for LPG injection, within each hole 4 there is inserted a tubular portion 5 of an adaptor element 6 having a substantially cylindrical shaped body having an inner cavity 7 opening outside through an outlet hole 8 defined within portion 5.

The various adaptor elements 6 (FIG. 2) are mounted thereby within corresponding seats 4 in lieu of the gasoline injection devices with which the engine is originally provided.

Figure 2:
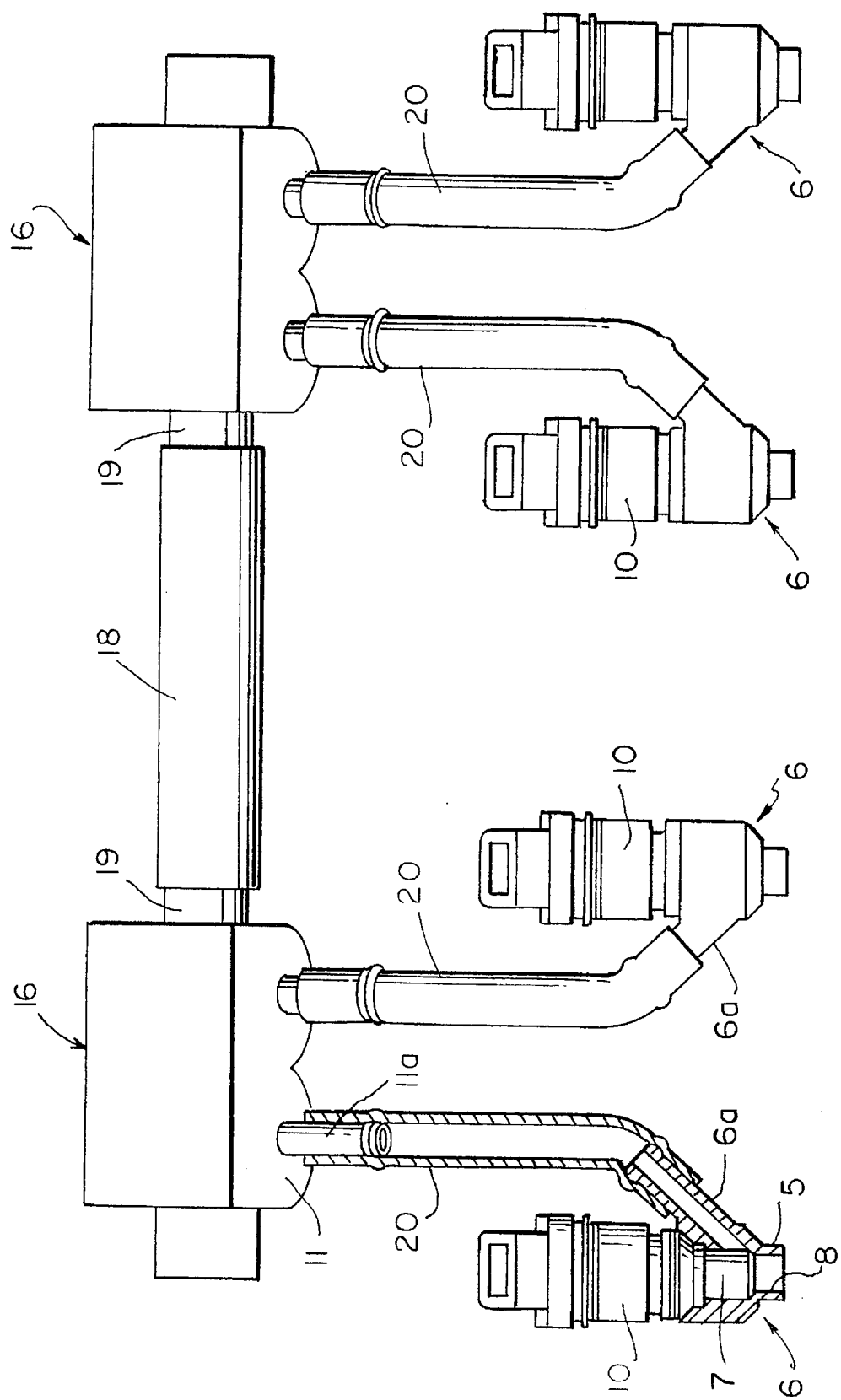
FIG. 2 is a front view of the device of FIG. 1.

Also with reference to FIGS. 1, 2, the body of each adaptor element 6 has at its end opposite to the tubular portion 5, a seat 9, coaxial with the outlet hole 8, which receives the usual gasoline injection device 10. Therefore, the latter is arranged with its axis coincident with that of hole 4, but in a position slightly displaced backwardly with respect to the conventional position in an engine operating only with gasoline injection.

With each cylinder of the engine there is also associated, in addition to the first adaptor element 6, a second adaptor element 11, whose body is separated and spaced apart from the first element 6 and supported by a bracket 12. For each engine cylinder, the respective second adaptor element 11 has a seat 13 for a corresponding LPG injection device 14. The seat 13 communicates to an inner cavity 15 of element 11 which on its turn communicates to the inner cavity 7 of the first element 6 through a flexible tube 20 of rubber or the like, whose ends are fitted on tubular nipples 6a, 11a, respectively, provided on the first adaptor element 6 and the second adaptor element 11.

In the case of the illustrated example (FIG. 2) the second adaptor elements 11 are associated two by two into a single body 16 which has an inner cavity 17 forming an intake manifold for LPG. The two inner conduits 17 of the two groups 16 communicate to each other by means of a rubber hose 18 whose ends are fitted on nipples 19 projection from structures 16. Naturally, it would be possible to provide a single structure including all the second adaptor elements 11, or yet, conversely, adaptor elements 11 which are all separate from each other.

Figure 3:
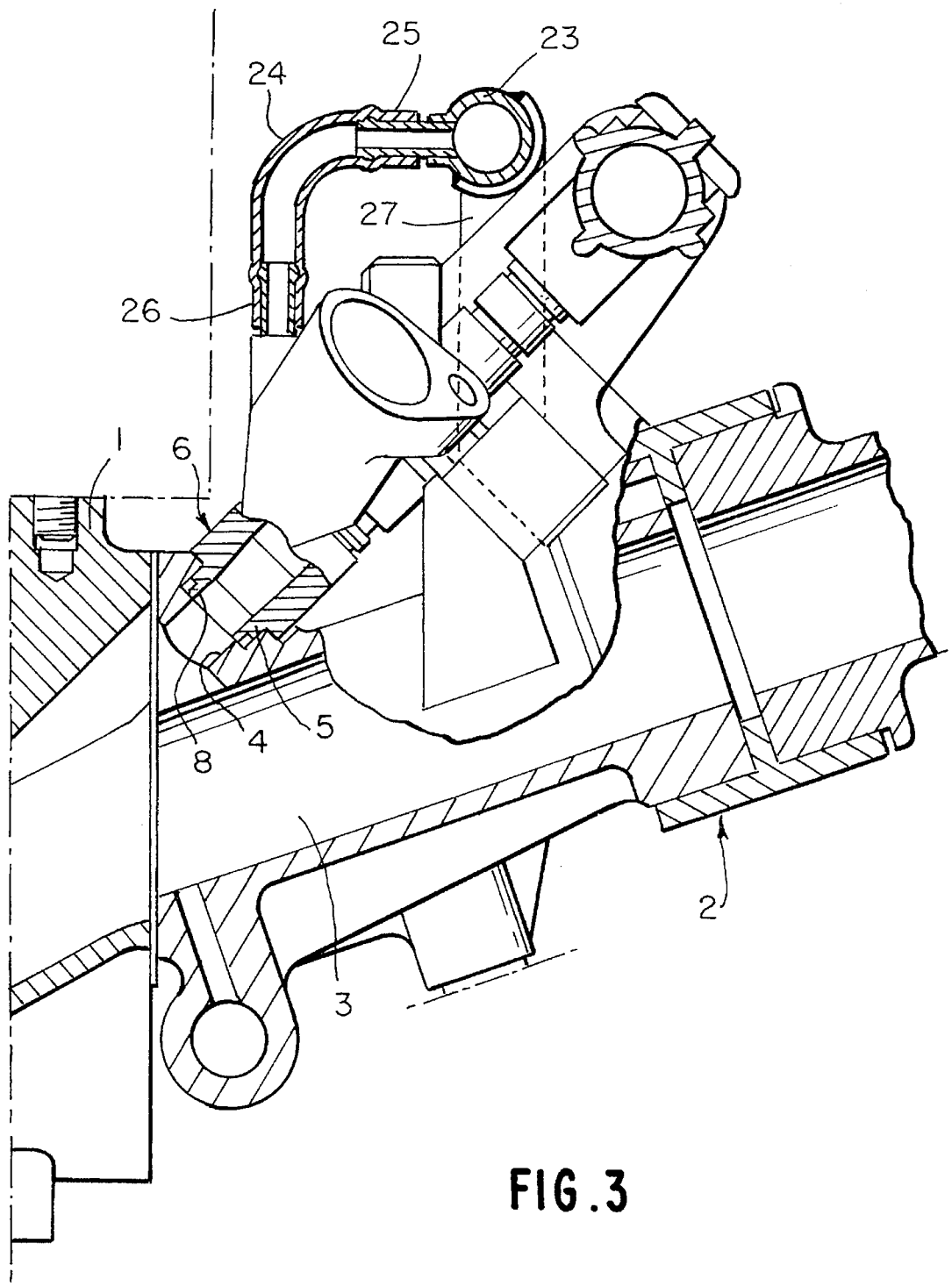
FIG. 3 is a variant of FIG. 1, corresponding to a second embodiment of the invention.
Figure 4:
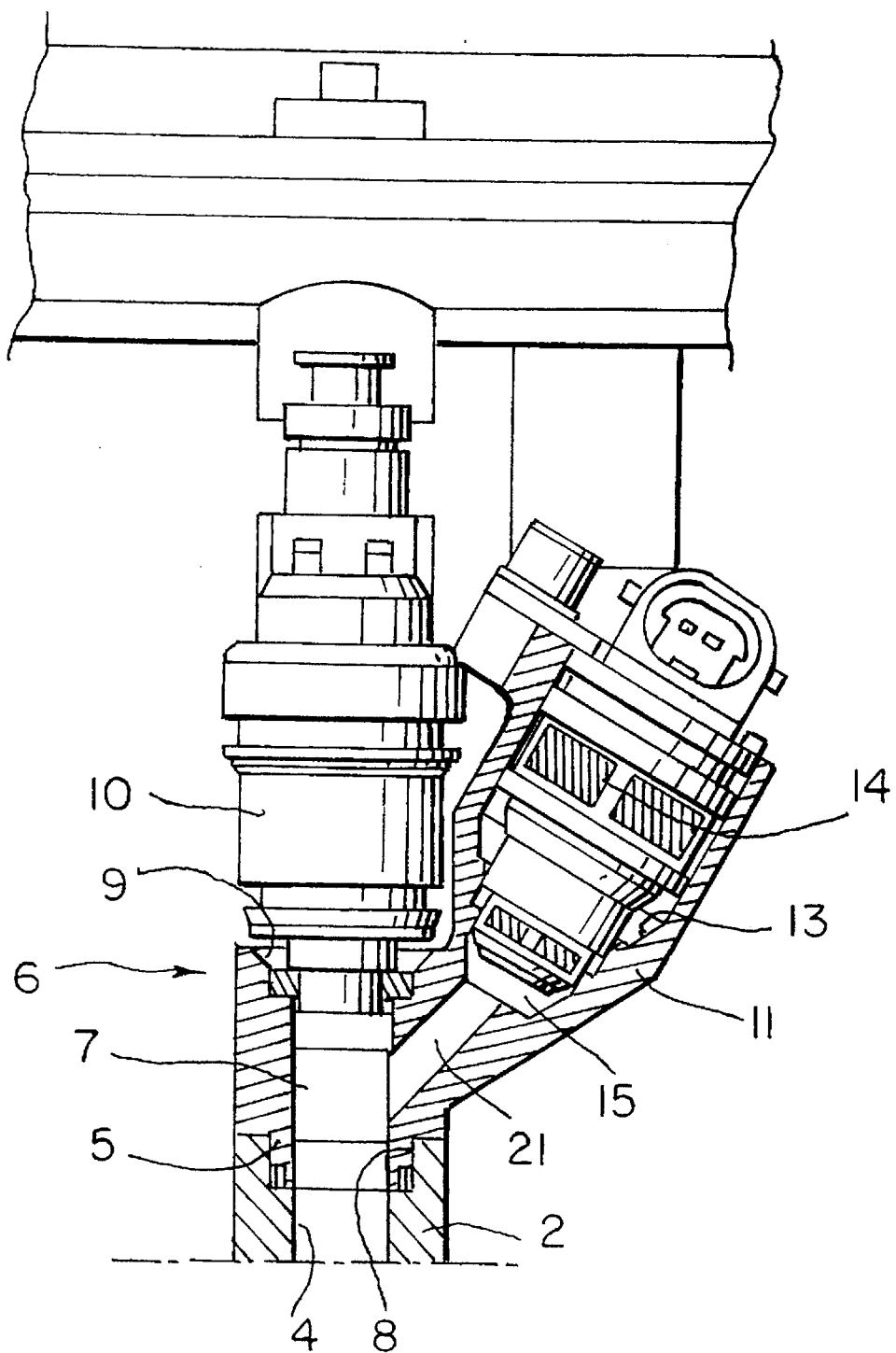
FIG. 4 is a cross-sectional view of the device of FIG. 3.

FIGS. 3, 4 relate to a second embodiment in which the position of each LPG injection device is less spaced apart from the outlet hole 8. In these figures, parts corresponding to those of FIGS. 1, 2 have been designated by the same reference numeral.

The main difference of the solution of FIGS. 3, 4 with respect to that of FIGS. 1, 2 lies in that in this case the two elements 6, 11 are included in a single piece, whose inner cavity 7 communicates to the seat 15 of the LPG injection device 14 through an inner conduit 21. Therefore, in this case with each cylinder there is associated an adaptor member 6, 11 which is separate from the others. The various adaptor members 6, 11 are communicated to a distribution conduit or rail 23 by means of respective rubber hoses 24 whose ends are fitted on nipples 25, 26 respectively formed on said rail 23 and the various elements 11. Rail 23 is formed by an element separate from the adaptor members 6, 11 and supported by a bracket 27 (FIG. 3).

As it is clearly apparent from the foregoing description, the device according to the invention, both in the embodiment shown in FIGS. 1, 2, and in the embodiment shown in FIGS. 3, 4, allows an engine with gasoline injection to be transformed with simple, rapid and unexpensive operations into an engine adapted to operate selectively either with gasoline injection or with LPG injection.

Figure 5:
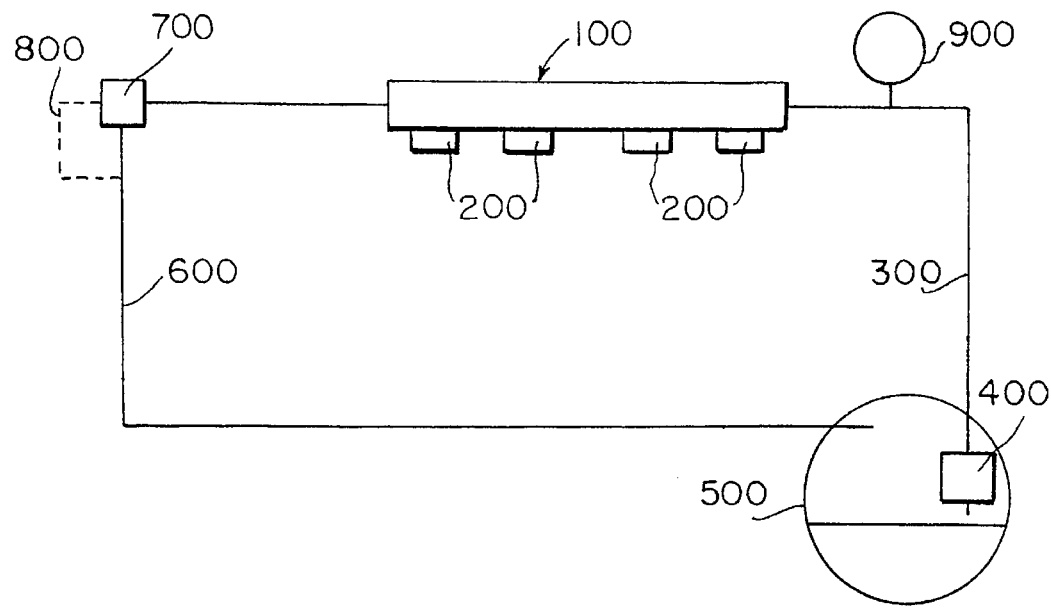
FIG. 5 shows a basic diagram of the LPG feed system of the engine according to the invention.

FIG. 5 diagrammatically shows the LPG injection system of the engine according to the present invention.

With reference to FIG. 5, numeral 100 generally designates the distributing conduit or "rail" for feeding LPG to four injectors 200 which are respectively associated with the four cylinders of a motor-vehicle internal combustion engine according to the invention. Therefore the engine is provided with an injection feed system adapted to operate selectively either with gasoline or LPG. In FIG. 5, the parts of the gasoline feed system have not been illustrated, since the system is of the conventional type with gasoline injection, with an electronic control unit which provides for controlling the gasoline injection as a function of the various parameters of operation of the system.

LPG is fed to rail 100 by means of a conduit 300 by a feed pump 400 which takes LPG from a reservoir 500. The quantity of LPG fed in excess to injectors 200 returns into reservoir 500 through a re-flow line 600 in which there is interposed a pressure adjuster 700 which provides for throttling line 600 so that pump 400 provides a pressure increase from the pressure within reservoir 500 up to the pressure at which injectors 200 are fed. Adjuster 700 is able to detect the pressure within reservoir 500 through a line 800 and to self adjust in order to keep said pressure increase substantially constant and close to 2–3 bars, with the variation of pressure of LPG within reservoir 500 (which is a function of the temperature). In this manner, when the temperature is very low (for example −20° C.) the LPG pressure in reservoir 500, which is about 1 bar, is increased up to about 3 bars by pump 400, whereas when the temperature is very high (for example +50° C.) the pressure of LPG within reservoir 500 is about 20 bars and is increased by pump 400 up to about 22 bars. In both said extreme conditions, the pressure at which the LPG in a liquid state is fed to injectors 200 is thus within the pressure range in which the injectors are able to operate properly. Naturally, when the LPG feed pressure changes, the opening time of injectors 200 must be varied. This function is fulfilled by the usual electronic control unit which is provided for the gasoline injection. In this case, however, the way of operation of the control unit is modified by a further auxiliary electronic control unit, as a function of the characteristics of the LPG which is fed to the injectors.

As mentioned already above, the gasoline feed rail is separate from the LPG feed rail 100, so as to avoid useless complications of the system. Furthermore, as shown in FIG. 5, the LPG feed pump 400 is preferably arranged inside the reservoir 500. This solution requires the adoption of pumps of the "gasoline" type and is preferable to that of providing the pump outside the reservoir.

In FIG. 5, reference numeral 900 designates a sensor of the LPG feed pressure whose output signal is fed to the auxiliary electronic control unit.

Figure 6:
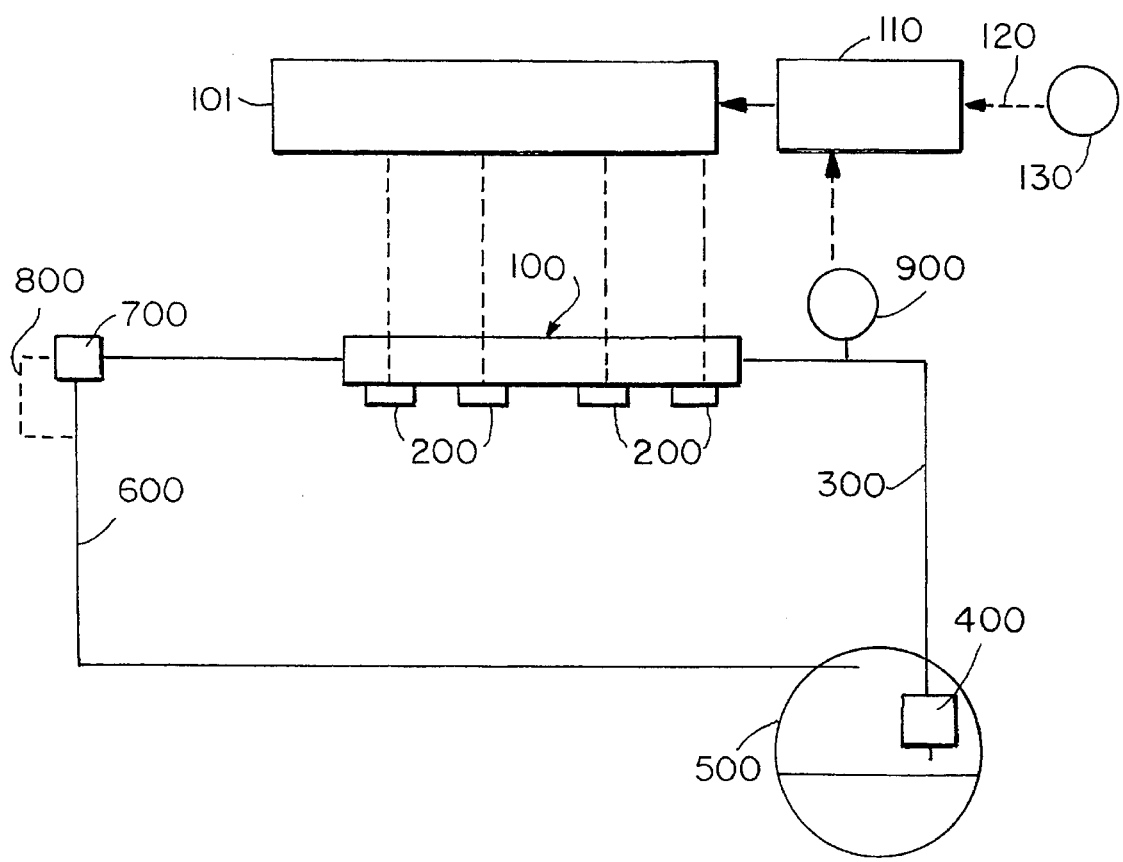
FIG. 6 is a further diagram of the feed system forming the subject of the invention.

With reference to FIG. 6, the parts in common with FIG. 5 are designated by the same reference numeral. When the LPG feed pressure varies as a result of the temperature changes, the opening time of injectors 2 must be varied. This function is fulfilled by the usual electronic control unit 101 which is provided for the gasoline injection. However, in the case of LPG operation, the mode of operation of the control unit 101 is modified by an auxiliary electronic control unit 110 as a function of the characteristics of the LPG which is fed. In particular, control unit 110 receives a signal 120 from a phonic wheel 130 constituting a sensor of the rotational speed of the engine shaft.

Figure 7:
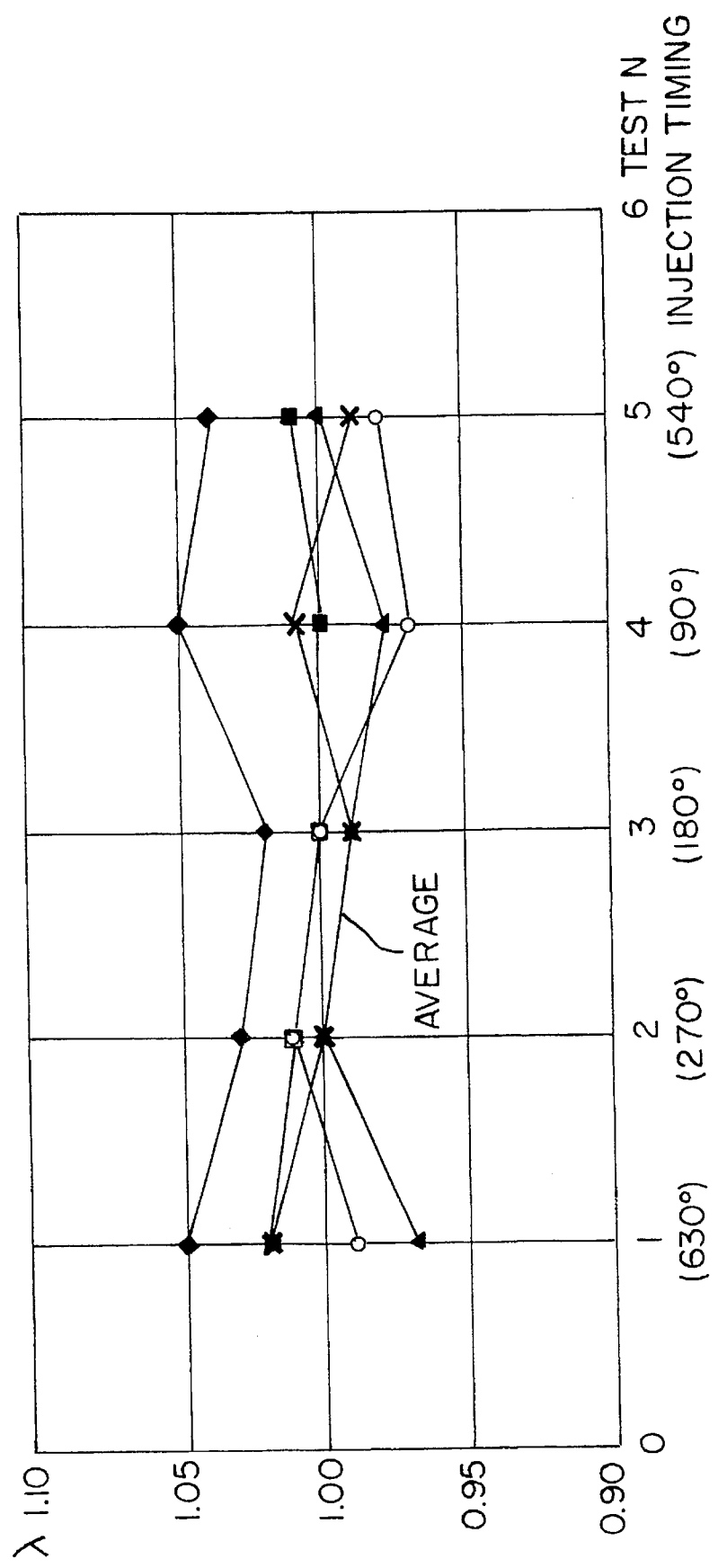
FIG. 7 is a diagram which shows the lack of influence of the timing of injection on the air/LPG ratio in the various cylinder of the engine.

As indicated, the electronic control unit 110 is programmed so as to control the beginning of the injection at a first cylinder of the engine when the first signal 120 is received after starting of the engine. After that, the injection into the other cylinders of the engine is controlled in sequence at regular intervals from the first injection. As shown, the system is not provided with means adapted to obtain a predetermined timing of the injection with respect to the angular position of the engine shaft. Indeed, the applicant has realized that this timing is of no importance for a proper operation of the engine, for the reasons indicated above. Therefore, where the time at which the first signal 120 is received by control unit 110 varies from case to case, this is absolutely of no influence on the performance of the engine and the distribution of the air/fuel mixture in the various cylinders of the engine. This circumstance has also been verified by tests, as shown in the diagram of FIG. 7. This diagram shows the values of the metering λ=air/LPG in the various engine cylinders, as well as the average value of the various cylinders, for different angular positions of the engine shaft at which the injection begins. As shown, with a variation of the timing of the injection, the values of lambda in the various cylinders are always within the admissible range and the average value of the metering in the various cylinders is substantially constant with a variation of the timing.

Naturally, while the principle of the invention remains the same, the details of construction and the embodiments may widely vary with respect to what has been described and illustrated purely by way of non limiting example, without departing from the scope of the present invention.

We claim:

1. Internal combustion engine, provided with a gasoline feed system, including many gasoline injection devices which are respectively associated with the cylinders of the engine, and an LPG feed system, including many LPG injection devices respectively associated with the cylinders of the engine, said engine being adapted to operate selectively with gasoline or LPG injection, characterized by the combination of the following features:

the engine includes, for each cylinder, an adaptor member provided both with a seat for a gasoline injector, and with a seat for an LPG injector, said adaptor member having an inner cavity communicated to said seats and opening into an outlet hole, said outlet hole being formed through a portion of said adaptor member which is to be fitted within a seat of the engine originally provided for receiving the gasoline injection device, said engine further comprising a distributing conduit or rail for feeding LPG to all the LPG injection devices, the LPG feed system comprises:

the plurality of said LPG injectors respectively associated with the various cylinders of the engine, said distributing conduit or rail for feeding LPG to the injectors, separate from the gasoline feed rail, an LPG reservoir, means for feeding LPG from the reservoir to the feed rail while keeping the LPG in a liquid state, said means including a pump which takes LPG from the reservoir and feeds it to the rail, a re-flow conduit for returning the quantity of LPG fed in excess to the injectors into the reservoir, a pressure adjuster, interposed in the reflow conduit for throttling this conduit so that said pump provides an increase from the pressure of LPG within the reservoir up to the pressure at which LPG is fed to the injectors, means associated with said pressure adjuster, able to detect the pressure of LPG within the reservoir, which is a function of the temperature, and to vary as a consequence the degree of throttling of the adjuster so as to keep said pressure increase at a substantially constant level, sensor means of the LPG feed pressure to the injectors, and electronic control means which receives output signals from said sensor means of the injector feed pressure and controls as a consequence the time during which the injectors remain open.

2. Internal combustion engine according to claim 1, characterized in that for each cylinder of the engine there is provided an adaptor member including a one-piece first element, including said portion with the outlet hole and the seat of the gasoline injection device, and a second element including the seat for the LPG injection device, located at a distance from the first element and connected thereto by a connecting tube which communicates the outlet hole of the first element to the seat of the LPG injection device formed in the second element.

3. Internal combustion engine according to claim 1, characterized in that for each cylinder of the engine there is provided an adaptor member including the said portion with the outlet hole and both said seats of the gasoline injection device and the LPG injection device.

4. Internal combustion engine according to claim 2, characterized in that said second elements of the adaptor members associated with the various cylinders of the engine are formed, either all together, or in groups, in a single structure including also a cavity acting as a distributing conduit or rail for feeding LPG.

5. Internal combustion engine according to claim 3, characterized in that said LPG feed rail is formed by an element separate from the adaptor members, each of which is connected thereto by means of a connecting tube.

6. Internal combustion engine according to claim 2, characterized in that each connecting tube is a hose of rubber or the like, whose ends are fitted on cooperating nipples provided at the connected elements.

7. Internal combustion engine according to claim 1, characterized in that said electronic control means comprises a first electronic control unit of a type conventionally used in gasoline injection systems, for controlling the gasoline injection, and a second electronic control unit able to modify the mode of operation of the first electronic control unit as a function of the characteristics of the LPG which is fed, for controlling the LPG injection yet by said first electronic control unit.

8. Internal combustion engine according to claim 1, characterized in that said pump is arranged inside the LPG reservoir.

9. Internal combustion engine according to claim 7, characterized in that it comprises sensor means of the rotational speed of the engine shaft, comprising a phonic wheel, and in that said electronic control means of the injectors are programmed to carry out the injection at a first cylinder, after starting of the engine, when a first signal from the phonic wheel is received and to control in sequence thereafter, at regular intervals from the first injection, the injection into the other cylinders of the engine, said system being therefore deprived of means for providing a predetermined timing of the injection with respect to the angular position of the engine shaft.

10. Internal combustion engine according to claim 5, characterized in that each connecting tube is a hose of rubber or the like, whose ends are fitted on cooperating nipples provided at the connected elements.

* * * * *